Figure 1:
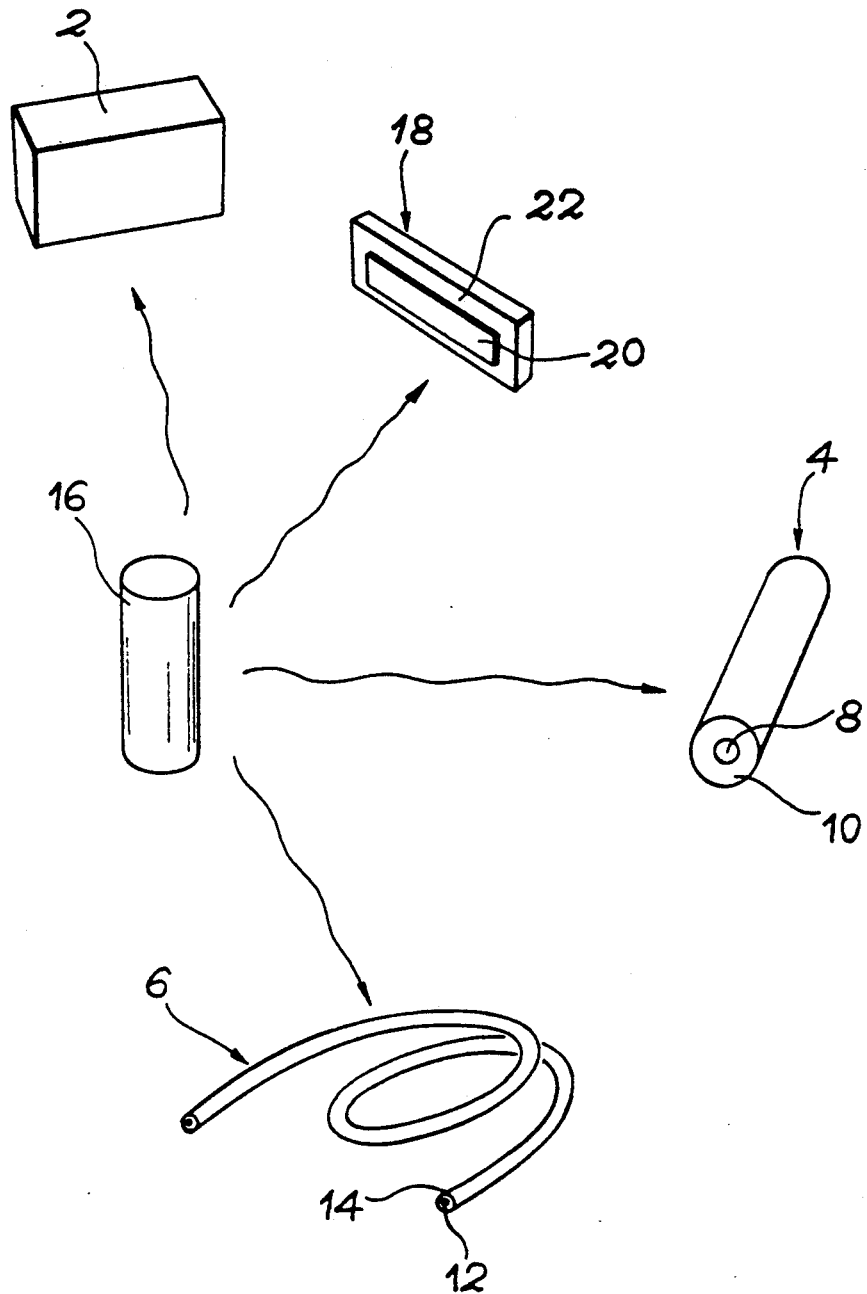

United States Patent [19]

Lambard et al.

[11] Patent Number: 5,313,547

[45] Date of Patent: May 17, 1994

[54] HALIDE GLASS MEDIUM CONTAINING TRIVALENT URANIUM IONS AND PROCESS FOR PRODUCING SAID MEDIUM

[75] Inventors: Jacques Lambard, L'Hay les Roses; Hubert Poignant, Ploulec'h, both of France

[73] Assignee: France Telcom Etablissement Autonome De Droit Public, France

[21] Appl. No.: 881,298

[22] Filed: May 12, 1992

[30] Foreign Application Priority Data

May 14, 1991 [FR] France ................................ 91 05802

[51] Int. Cl.$^5$ ............................................... G02B 6/24
[52] U.S. Cl. ...................................... 385/142; 501/40
[58] Field of Search ......................... 501/40; 65/35.2; 385/141, 142

[56] References Cited

U.S. PATENT DOCUMENTS

| | | | |
|---|---|---|---|
| 3,930,873 | 1/1976 | Kaes et al. | 501/40 |
| 4,618,211 | 10/1986 | Fleury, V | 350/96.15 |
| 4,659,352 | 4/1987 | Robinson | 501/40 |
| 4,842,631 | 6/1989 | Hutta | 65/32.5 |
| 4,872,894 | 10/1989 | Hutta | 65/3.11 |
| 4,962,995 | 10/1990 | Andrews et al. | 550/96.34 |
| 5,015,281 | 5/1991 | Hau et al. | 65/32.5 |
| 5,045,507 | 9/1991 | Tran | 501/40 |
| 5,244,846 | 9/1993 | Ohishi et al. | 501/40 |

FOREIGN PATENT DOCUMENTS

| | | |
|---|---|---|
| 0036373 | 9/1981 | European Pat. Off. . |
| 0312084 | 4/1989 | European Pat. Off. . |
| 1587156 | 4/1981 | United Kingdom . |
| 1587157 | 4/1981 | United Kingdom . |
| 2082168 | 3/1982 | United Kingdom . |

OTHER PUBLICATIONS

Patent Abstract of Japan, vol. 12, No. 358 (C-531) [3205], Sep. 26, 1988, & JP-A 63 112440, (Sumitomo Electric Ind. Ltd.), May 17, 1988.
Journal of Non-Crystalline Solids, vol. 107, Nos. 2-3, Jan. 1989, Amsterdam, NL, pp. 178-186; M. A. Chamarro et al.: "Energy Transfer Study Between (Yb,Pr), (Yb,Sm) and (Yb,Dy) in Fluorohafnate Glasses", p. 178.
P. W. France, "Fluoride Glass Optical Fibers", 1990, Blackie, London, GB, pp. 246-251.
Journal of Non-Crystalline Solids, vol. 70, No. 1, Feb. 1985, Amsterdam, NL, pp. 37-44; P. E. Fisanich et al.: "Radiation-Induced Defects in Fluoride Glass", pp. 42-44.

Primary Examiner—Mark L. Bell
Assistant Examiner—A. Wright
Attorney, Agent, or Firm—Pearne, Gordon, McCoy & Granger

[57] ABSTRACT

Said medium is a halide glass (2, 8, 12, 20) containing uranium ions at least partly in the form $U^{3+}$ and having, at least at one point of a region of the near infrared between 2.2 and 3.4 micrometers, an optical attenuation not exceeding 0.01 cm$^{-1}$. For the production thereof, preparation takes place of a halide glass containing uranium ions, at least partly in the form $U^{4+}$ and/or $U^{5+}$, and having at least at this point the aforementioned attenuation. The glass is exposed to ionizing radiation able to produce trivalent uranium ions from the uranium ions of the prepared glass. Application to the production of optical guides, whereof the guiding parts are formed from such a medium.

17 Claims, 3 Drawing Sheets

HALIDE GLASS MEDIUM CONTAINING TRIVALENT URANIUM IONS AND PROCESS FOR PRODUCING SAID MEDIUM

The present invention relates to a medium containing trivalent uranium ions and to a process for producing said medium.

More specifically, the invention relates to an electrically insulating medium, which is doped with uranium ions in the trivalent state and also relates to the production of said medium. The latter can be conditioned for forming a laser emitter or an optical amplifier.

A matrix doped with $U^{3+}$ ions can constitute the active element of a doped insulant laser source or a doped insulant laser amplifier. The said laser source or amplifier emits infrared light when the active $U^{3+}$ ions of the matrix are selectively excited, said light having a wavelength between 2.2 and 2.7 micrometres.

This near infrared range is of considerable interest due to the potential development of long distance transmissions using optical fibres containing heavy metals.

The wavelengths between 2.5 and 2.6 micrometers correspond to the ultra-transparency region of fluoride glasses such as fluorozirconate and fluorohafnate glasses discovered by J. Lucas and M. Poulain in 1974.

These fluoride glasses at present have small optical losses of approximately 1 dB/km at about 2.6 micrometers, but have an intrinsic attenuation level close to $10^{-3}$ dB/km, which makes the glasses potentially more transparent than silica.

The possibility of using such glasses for producing optical transmissions over distances exceeding 1000 km and without any reamplification of the optical signal makes the use of optical fibres produced with these glasses very attractive for telecommunications.

The use of an optical fibre transmission system more particularly requires the development of light sources emitting at a wavelength corresponding to that where the optical fibre brings about a minimum attenuation of the light signal which it transmits. These light sources must be compatible with the use made thereof for telecommunications.

The use of light guides for information transmission can only be developed by using laser sources. Moreover, due to the high information transmission rates of approximately 1 gigabit/sec, the light sources must emit continuously.

A certain number of laser sources operate in a region close to 2.6 micrometers. Thus, a h.f. gas laser is known, which emits at a wavelength of 2.8 micrometers, but this laser is not suitable for telecommunications due to the maintenance resulting from the replenishment of the gases.

Tunable vibrational lasers of the type having a coloured centre with an impurity such as Na or Li in a KCl matrix are known, which emit in the region between 2.5 and 2.65 micrometers, only at the temperature of liquid nitrogen and which cannot be developed for use in optical communications.

For the same reason, lasers containing transmission metal ions such as $Co^{2+}$ ions in $MgF_2$ or $ZnF_2$ and which are tunable between 1.2 and 2.3 micrometers are not suitable.

Conversely, semiconductor lasers, where the emission wavelength is dependent on the composition of the semiconductor material constitute tunable sources well adapted to telecommunications needs.

However, laser diodes emitting continuously in the requisite infrared region, such as diodes with the double heterojunction InGaAs/InAsPSb emitting between 2.5 and 2.7 micrometers have to be cooled to below the temperature of liquid nitrogen.

Moreover, doped insulant lasers, in which an external radiation optically excites the emission of atoms introduced in the form of metal ions and rare earths into an insulating matrix (a crystal or a glass) constitute a family of lasers potentially able to supply sources emitting in the infrared and operating at ambient temperature.

Using rare earths, laser emissions have been observed in a medium formed from fluorides at 2.68 micrometers with $Ho^{3+}$ ions, at 2.35 micrometers with $Tm^{3+}$ or $Dy^{2+}$ ions and at 2.7 micrometers with $Er^{3+}$ ions, which does not cover the required region. However, laser emissions have been obtained between 2.51 and 2.61 micrometers using the ion $U^{3+}$ in a fluorine-containing crystalline medium. As indicated in Handbook of Lasers with selected data on Optical Technology, published by CRC Press, R. C. West, 1972, p 392, they correspond to the transition $^4I_{11/2}$ to $^4I_{9/2}$.

In the present state of the art only the ion $U^{3+}$ acting as the dopant in a matrix can make it possible to produce a laser source and/or a light amplifier compatible with a telecommunications use emitting in the region 2.5 to 2.6 micrometers, which corresponds to the minimum of optical losses of fluorozirconate, fluorohafnate and fluorozirconohafnate glasses.

It has also been demonstrated that optical fibres doped with ions of rare earths can constitute "active fibres" playing a very important part in optical communications, particularly in the 1.3 and 1.55 micrometer bands, either as fibre laser sources, or as linear amplifier fibres.

The crystalline matrixes of fluorides such as $BaF_2$, $CaF_2$ or $SrF_2$, when used as hosts for the uranium $U^{3+}$ ions with a view to obtaining laser emissions between 2.5 and 2.6 micrometers, do not make it possible to produce such light guides.

Consideration was then given to the use of fluoride glasses for receiving the uranium $U^{3+}$ ion, in the same way as this has been done for rare earths.

It is pointed out that uranium has two stable valency states, namely $U^{4+}$ and $U^{6+}$, the $U^{3+}$ form being unusual and requires a neutral or preferably a reducing environment.

This $U^{3+}$ form has been identified in various inorganic media such as eutectics in the chloride medium LiCl-KCl at 400° C., in melted fluoride media such as LiF-BeF$_2$, LiF-NaF-KF at 540° C., in the solid phase in $LaCl_3$, $BaF_2$, $CaF_2$ and in fluoride glasses. In these various media, the $U^{3+}$ ions are obtained in the presence of a reducing agent.

Reference can be made in this connection to the following documents:

G. D. BOYD, R. J. COLLINS, S. P. S. PORTO, A. YARIV, Physical Review Letters, vol. 8, No. 7, 1962, pp 269 to 272, L. N. GALKIN, P. P. FOEFILOV, Soviet Phys. Dokl., vol. 2, May-June 1957, p 255 to 257, D. M. GRUEN, R. L. McBeth, J. of Inorg. Nucl. Chem., vol. 9, 1959, pp 290 to 301.

In order that a medium containing $U^{3+}$ ions is able to constitute part of a laser system with an insulant doped with $U^{3+}$ ions or an optical amplifier with $U^{3+}$ ions, said medium must not diffuse the light passing through it.

A known means for restricting the diffusion of a light is to guide the latter by an optical guide such as a planar optical guide or an optical fibre.

The known doped insulant media advantageously constitute the core of optical fibres, such as fluoride glass fibres. These fibres are used as laser amplifiers, e.g. in the infrared, when the doping ions are ions of a rare earth. The incorporation of uranium into a fluoride glass is known, particularly from the article by M. Poulain, published in Verres Réfractaires, vol. 32, No. 4, 1978, pp 505-513.

This article indicates that in the $BaF_2$—$UF_4$—$ZrF_4$ system the vitreous zone extends up to a molar $UF_4$ concentration of 20%. This article also teaches that a fluoride glass melted under a neutral atmosphere has a black colour, which disappears in the presence of atmospheric oxygen.

Reference is also made to the patent of Nippon Telegraph and Telephone Corporation with the filing No. 59-194024, filing date Sep. 18, 1984 and referred to hereinafter as document (1). The latter discloses the production of material which fluoresces in the green and infrared regions. This fluorescent material is obtained by introducing into a fluorozirconate or fluoroaluminate glass uranium as the dopant and in form $UF_4$ or in the form of a uranyl salt.

Document (1) indicates that the fluorescence is observed in the band between 2.2 and 2.6 micrometers, which is associated with the transition of the uranium $U^{3+}$ ion can be used for producing a fluorescent optical fibre.

Reference is also made to the article by A. G. Clare et al, published in J. Phys. Condens. Matter, vol. 1, No. 44, 1989, pp 8753-8758 and referred to hereinafter as document (2). The latter discloses that it is possible to obtain a fluoride glass doped with $U^{3+}$ ions by introducing the requisite uranium quantity in the form $UF_4$ and by melting the mixture under undefined reducing conditions.

Documents (1) and (2) indicate the possibility of incorporating uranium ions at valency 3 into a fluoride glass and the use of the fluorescence of these ions.

It is pointed out that the authors of document (1) have not provided any proof regarding the presence of $U^{3+}$ ions in their glass, either by giving particular operating conditions, or by a characteristic signature of these ions. In their glass, the uranium is at best at valency 4.

In addition, in the glass described in document (2), the majority of the uranium ions are trivalent, but the glass has poor optical properties.

It is well known in the chemistry of preparing fluoride glasses, that melting in a non-oxidizing atmosphere and a fortiori reducing atmosphere leads to a black glass. This is attributed to the presence of reduced or partly reduced species such as certain formation cations of the glass or certain cations added to ensure the formation of the glass and/or, in the case of document (2), the stability of the $U^{3+}$ ion in the glass. Such glasses prepared in the presence of reducing agents or in a reducing atmosphere are unsuitable for optical use.

It is well known to the Expert that all the attempts made to chemically introduce $U^{3+}$ ions into a fluoride glass maintaining good optical properties have failed due to the fact that, contrary to the fluoride crystals such as $CaF_2$ or $BaF_2$, on the one hand the glass is a medium still containing impurities such as $O^{2-}$ and $OH^-$ which are incompatible with the stability of the chemically introduced $U^{3+}$ ions and on the other hand such a multicomponent glass has to be produced under oxidizing conditions, which are incompatible with the presence of stable $U^{3+}$ ions.

Documents (1) and (2) do not give the conditions for producing a glass into which the $U^{3+}$ ions would be introduced, or the optical characteristics of said $U^{3+}$-containing glass and in particular in the fluorescence region of the $U^{3+}$ ions, or the useful $U^{3+}$ concentrations to ensure that the said glass can be used as a laser emitter or as an optical amplifier.

Reference is also made to the article by Staebler, published in Applied Physics Letters, vol. 14, No. 3, 1969, p 93-94. This article and the references given therein discloses that a reversible reduction of the cations of rare earths within $CaF_2$ can be obtained under the action of high energy photons, such as gamma, X or ultraviolet rays, but these references do not suggest that such a photoreduction is possible with cations other than those of the group of lanthanides, or that said photoreduction can be carried out in media other than crystal such as $CaF_2$.

Thus, no non-crystalline medium is known, which contains $U^{3+}$ ions and has a good optical quality, particularly in the near infrared and no process is known making it possible to produce such a medium.

The object of the present invention is to obviate these disadvantages.

The invention firstly relates to a non-crystalline medium containing trivalent uranium ions and having a high optical quality in the near infrared region.

More specifically, the present invention firstly relates to a medium containing trivalent uranium ions, characterized in that said medium is a halide glass containing uranium ions, whereof at least part are trivalent ions and in that the medium has, at least at one point of the near infrared region between 2.2 and 3.4 micrometers, an optical attenuation not exceeding 0.01 $cm^{-1}$.

This halide glass can also contain uranium ions of valency 4 ($U^{4+}$) and/or uranium ions of valency 5 ($U^{5+}$).

Preferably, said medium has an optical attenuation not exceeding 0.01 $cm^{-1}$, at least at one point of the range 2.2 to 2.7 micrometers.

A medium is then provided which has a good transparency in the near infrared range and which covers the region of the emission of $U^{3+}$ ions.

In the invention, the halide glass formation anions (majority anions) are those of at least one of the elements from the group including fluorine, chlorine, bromine and iodine.

Preferably, the medium according to the invention does not contain uranium in the form of $U^{6+}$ ions, e.g. in the form of uranyl ions, or uranium in a form more reduced than valency 3, such as $U^{2+}$ ions, nor the metallic uranium $U^0$.

The aim is also that the said medium containing valency 3 uranium ions has minimum extrinsic losses in the infrared.

Among the causes of these losses are the presence of absorbent impurities (other than those introduced into the glass, namely uranium and possibly certain rare earths, whose function will be described hereinafter) and the existence of diffusion centres formed from imperfections of size of approximately 0.1 to 10 micrometers.

Thus, in the region between 2.2 and 3.4 micrometers it is possible to ensure that the minimum of optical losses of the medium according to the invention does not exceed 0.01 $cm^{-1}$.

In order that the medium according to the invention emits or amplifies infrared light in the region 2.2 to 2.7 micrometers, the active $U^{3+}$ ions of the medium are excited by an appropriate external energy source.

Preferably, to do this, the $U^{3+}$ ions are selectively pumped at one of the wavelengths of the following regions: 1.2, 0.95, 0.8 to 0.9, and 0.7 to 0.6 micrometer.

In the invention, the halide glass can be a metal halide glass containing at least one chemical element chosen from among zirconium, hafnium, the group of alkali metals, the group of alkaline earths, aluminum, gallium, scandium, yttrium, the group of rare earths and thorium.

The group of alkali metals covers lithium, sodium, potassium, rubidium and cesium. The group of alkaline earths covers beryllium, magnesium, calcium, strontium and barium. The group of rare earths covers lanthanum, cerium, praseodymium, neodymium, promethium, samarium, europium, gadolinium, terbium, dysprosium, holmium, erbium, thulium, ytterbium and lutetium.

In the invention, the $U^{3+}$ ion concentration in the halide glass can vary within wide limits. For example, the molar fraction of $U^{3+}$ ions can be between 1 and 10,000 ppm.

In order to give the said halide glass the transparency necessary for certain envisaged applications and in particular a transparency at at least one point of the infrared region between 2.2 and 2.7 micrometers, corresponding to the fluorescence of $U^{3+}$ ions, the molar fraction of $U^{3+}$ ions is preferably between 2 and 400 ppm. This corresponds to concentrations of approximately $10^{16}$ to $10^{19}$ $U^{3+}$ ions per cm$^3$.

According to a preferred embodiment of the medium according to the invention, the halide glass containing the trivalent $U^{3+}$ uranium ions is a fluoride glass.

Preferably, to obtain a medium according to the invention having very low optical attenuations due to the actual medium, in the spectral region between 2.5 and 2.6 micrometers, the fluoride glass is chosen from among fluoroberyllate glasses, fluorozirconate glasses such as those of type ZBLA and ZBLAN, fluorohafnate glasses such as those of the type HBLA and HBLAN, fluorozirconohafnate glasses such as those of the type ZHBLA and ZHBLAN, fluoroaluminate glasses such as those of the BATY type, mixed fluorozirconoaluminate glasses such as those of the AZYMN type, mixed fluorohafnoaluminate glasses such as those of the AHYMN type and mixed fluorozirconohafnoaluminate glasses such as those of the AZHYMN type.

The significance of the letters and acronyms designating the basic constituents of these glasses is: Z=zirconium, H=hafnium, B=barium, L=lanthanum, A=aluminium, N=sodium, Y=yttrium and M=at least one element from the list formed by the alkaline earth group.

The fluoride glass according to the invention containing uranium in the form of trivalent ions can also contain at least one other halogen chosen from within the group including chlorine, bromine and iodine.

The choice of the medium containing $U^{3+}$ ions, i.e. the cationic and anionic-composition, as well as the length of the medium traversed by the light or power of the external excitation source, can make it possible to bring about the wavelength adjustment of the maximum of the fluorescence signal corresponding to the $U^{3+}$ ions.

The medium according to the invention can contain, apart from the $U^{3+}$ ions, other ions known as "codopant ions", by means of which it is possible to obtain the optical pumping of the active $U^{3+}$ ions. For this purpose it is possible to use ions of one or more rare earths or metal ions such as $U^{4+}$ ions.

For example, for certain rare earth ions used as codopants of the active $U^{3+}$ ions, we give the regions of the wavelengths at which the energy transfer takes place on the active $U^{3+}$ ion: with $Ho^{3+}$ transfer takes place at 1.2 micrometer, with $Nd^{3+}$, $Er^{3+}$ and $Tm^{3+}$ transfer takes place at 0.82 to 0.9 micrometer, with $Pr^{3+}$ and $Eu^{3+}$ transfer takes place at 0.6 micrometer.

Thus, according to a preferred embodiment of the medium according to the invention, the halide glass also contains $U^{4+}$ ions or ions of at least one rare earth chosen from within the group constituted by neodymium, praseodymium, europium, holmium, erbium, samarium, thulium, dysprosium and ytterbium.

The medium according to the invention containing the $U^{3+}$ ions can be conditioned in the form of a solid bar, a planar optical guide or an optical fibre.

One of the applications of the halide glass medium having good optical properties according to the invention is that of the optical guidance glass of a light guide having a cylindrical or planar geometry.

In the case of a cylindrical geometry, said guidance glass referred to as the "core" and which contains $U^{3+}$ ions is covered by an envelope called a "sheath", which has a refractive index below that of the core glass. Thus, an optical fibre is obtained. The fibre core diameter is small, e.g. below 100 and typically approximately 3 to 30 micrometers.

In the case of the planar geometry, the guidance glass formed from halide glass containing $U^{3+}$ ions is formed on a planar substrate having a refractive index below that of the guidance glass. This gives a planar optical guide.

This guidance glass can be formed by ion implantation or thermal diffusion into the planar substrate, in order to modify the refractive index of part of said planar substrate, which leads to a semicylindrical guidance glass, or can be formed by the deposition of a covering material on the planar substrate (typical guidance glass thickness 3 to 30 micrometers).

Thus, the planar substrate is on one side of the optical guidance glass, whilst on the other side there can be air or a supplementary covering material, whose refractive index is below that of the guidance glass.

This leads to a light guide (optical fibre or planar optical guide) making it possible to obtain high light intensities for small cross-sections and to obtain, more easily than with glass in the solid state doped with $U^{3+}$ ions, optical amplification phenomena of the type obtainable with laser sources and amplifiers.

The sheath surrounding the core glass of an optical fibre, said core being formed from a medium containing $U^{3+}$ ions according to the invention, can be constituted by a material chosen from among halide glass, fluoride glass, oxide glass, oxyfluoride glass, phosphate glass, fluorophosphate glass and plastics materials.

In the case where the medium according to the invention is formed on a planar substrate to obtain a planar optical guide, said substrate is of the same nature as the optical fibre sheath material. Generally an optical fibre sheath is formed from a material of the same nature as the optical fibre core.

In the considered application of the invention, the sheath (respectively planar substrate) is preferably formed from a halide glass which, in a preferred embodiment, has a composition close to that of the halide glass of the core (respectively the optical guidance glass).

Preferably, when the core glass (respectively optical guidance glass) is a fluoride glass, the sheath glass (respectively planar substrate glass) is also a fluoride glass.

The optical guide, whose guiding part is formed from a medium according to the invention can be an index jump guide, or an index gradient guide, or a guide whose configuration is adapted to multimode propagation or to monomode propagation at at least the wavelength of the light emitted by the guide.

There is also no disadvantage as a result of introducing uranium ions into the sheath glass or planar substrate glass, but generally this is not necessary.

Finally, the optical guide or planar optical guide can be covered with a protective envelope. The material of said protective envelope can be a fluoride glass, oxide glass, oxyfluoride glass, phosphate glass, fluorophosphate glass, plastics material, a synthetic resin or a Teflon film.

The medium according to the invention containing uranium in the state of trivalent ions and optionally the ions of a rare earth as the codopant, can be in the form of a solid bar or can constitute the core of an optical fibre or the optical guidance glass of a planar optical guide.

This medium can be used as a laser emitter or as an optical amplifier.

It should be noted that the optical guide-type structures are more advantageous than the bar from the energy conversion standpoint.

In order to improve the optical performance characteristics of the optical guide constituted by the optical fibre or the planar guide and used as the doped insulant laser source or amplifier, a choice is preferably made of the geometrical and physical characteristics of the materials constituting the optical guide in such a way that the light passing through the latter has a monomode propagation. This applies to the excitation light and to the emission light due to the $U^{3+}$ ions.

The guide can be monomode as from a wavelength of 0.6 micrometer. However, for emission by $U^{3+}$ ions, it is preferable that it is monomode at least from 2.2 micrometers.

Thus, according to the invention, it is possible to use a halide glass, e.g. a fluoride glass, containing uranium in the state of trivalent ions and optionally the ions of a rare earth, for producing the optical guidance glass of a monomode optical guide at least from a wavelength of 2.2 micrometers.

In special applications an optical guide, whose optical guidance glass is formed from a halide glass containing $U^{3+}$ ions is used (a) either as a light source in the region between 2.2 and 2.7 micrometers for the transmission of optical communications by means of an optical fibre, (b) or as an optical amplifier when the guide, whose optical guidance glass is a $U^{3+}$ ion-containing halide glass, is inserted into a line formed from optical fibres.

Advantageously, in order to have a good optical connection, the guide whose optical guidance glass is formed from a $U^{3+}$ ion-containing halide glass is then optically coupled with an optical fibre, whose core is formed from a fluoride glass (case (a)) or with a plurality of fibres, whose cores are formed from fluoride glasses (case (b)).

In the use of the medium according to the invention as a laser source or as an optical amplifier, said medium can be in the form of a solid bar, e.g. having a circular or rectangular cross-section, or in the form of a guidance glass, or active part of a light guide, either having a planar geometry in the case of a planar optical guide, or a cylindrical geometry in the case of an optical fibre.

When the medium according to the invention constitutes the optical guidance glass of an optical guide used as a laser source or optical amplifier, it is necessary to introduce energy into the optical guidance glass in order to excite the active ions thereof. Any random external energy source can be used, but it is advantageous to use incoherent or coherent optical pumping.

Preferably, the optical pumping is carried out with another laser chosen from within the group including doped insulant lasers, dye lasers, ionized gas lasers, superluminescent diodes and semiconductor laser diodes.

The invention also relates to a process for producing the medium according to the invention containing trivalent uranium ions.

According to the invention, said $U^{3+}$ ion-containing medium having good optical properties in a region of the near infrared is obtained by firstly preparing a halide glass containing $U^{4+}$ and/or $U^{5+}$ ions (i.e. $U^{4+}$ or $U^{5+}$ ions, or both $U^{4+}$ and $U^{5+}$ ions) and which has the requisite optical properties.

More specifically, the process according to the invention comprises the following stages:

initially preparing a halide glass containing uranium ions, whereof at least part are tetravalent and/or pentavalent uranium ions and having, at at least one point of a region of the near infrared between 2.2 and 3.4 micrometers (or preferably at at least one point of the range between 2.2 and 2.7 micrometers), an optical attenuation not exceeding 0.01 $cm^{-1}$, and then subjecting said halide glass containing uranium ions, whereof at least part are tetravalent and/or pentavalent uranium ions to ionizing radiation able to produce trivalent uranium ions from the uranium ions of the initially prepared halide glass.

It is advantage to follow said obtaining of the $U^{3+}$ ions in the halide glass by a bleaching or whitening treatment of the latter. The latter can be obtained either by a thermal effect, or by the action of an ultraviolet radiation. This bleaching treatment is intended to bring about the disappearance or at least reduction in the number of colour centres liable to exist in the glass.

At least part of the uranium ions contained in the initially prepared halide glass can be tetravalent uranium ions. Preferably, in the initially prepared halide glass, the uranium is exclusively in the form of tetravalent ions ($U^{4+}$).

The concentration of the $U^{4+}$ ions in the initially prepared halide glass can be such that the molar fraction of said $U^{4+}$ ions is between 1 and 10,000 ppm.

Preferably, to give the halide glass the optical properties necessary for certain envisaged applications, e.g. to give it a good transparency in the range between 2.2 and 2.7 micrometers, the molar fraction of the $U^{4+}$ ions in the initially prepared halide glass is between 5 and 500 ppm.

The halide glass containing uranium in the form of $U^{4+}$ ions and/or $U^{5+}$ ions can be prepared, for optical amplification and laser source applications, in the form of a solid glass, such as a bar in one of the configurations mentioned hereinbefore.

In preferred constructions, the initially prepared halide glass containing the valency 4 and/or valency 5 uranium ions, forms the optical guide glass, or the guiding part of a composite glass element. The composite element can be an optical fibre, in which case the guiding part constitutes the core of the fibre and which is surrounded by a sheath. The composite element can also be a planar optical guide, in which case the guiding part is connected to a planar substrate.

The external portion of the composite element, when the latter is an optical fibre, incorporates an optical sheath and optionally, around the latter, a protective envelope.

The composite element can be chosen from within the group including optical fibres, optical fibre blanks, optical fibre preforms and planar optical guides. The preforms can be stretched or drawn out to give optical fibres.

According to the inventive process, the halide glass containing the uranium in the form of $U^{4+}$ and/or $U^{5+}$ ions is exposed to electromagnetic or corpuscular radiation able to directly or indirectly produce $U^{3+}$ ions on passing through the glass.

This ionizing radiation can be chosen from within the group including X photons, gamma photons, electrons, helions (helium nuclei), protons, deutons (deuterium nuclei), tritons (tritium nuclei), heavy ions and neutrons having an adequate energy to transform over the desired depth the uranium ions of the initially prepared halide glass into trivalent uranium ions. Preferably, the initially prepared halide glass is a fluoride glass.

According to a preferred embodiment of the process according to the invention, said initially prepared fluoride glass is chosen from among fluoroberyllate glasses, fluorozirconate glasses, such as those of the type ZBLA and ZBLAN, fluorohafnate glasses such as those of the type HBLA and HBLAN, fluorozirconohafnate glasses such as those of the type ZHBLA and ZHBLAN, fluoroaluminate glasses such as those of the BATY type, mixed fluorozirconoaluminate glasses such as those of the AZYMN type, mixed fluorohafnoaluminate glasses such as those of the AHYMN type and mixed fluorozirconohafnoaluminate glasses such as those of the AZ-HYMN type.

The invention is described in greater detail hereinafter relative to non-limitative embodiments and the attached drawings, wherein show:

FIG. 1 Diagrammatically a process according to the invention making it possible to obtain $U^{3+}$ ion-containing halide glass.

Figure 2:
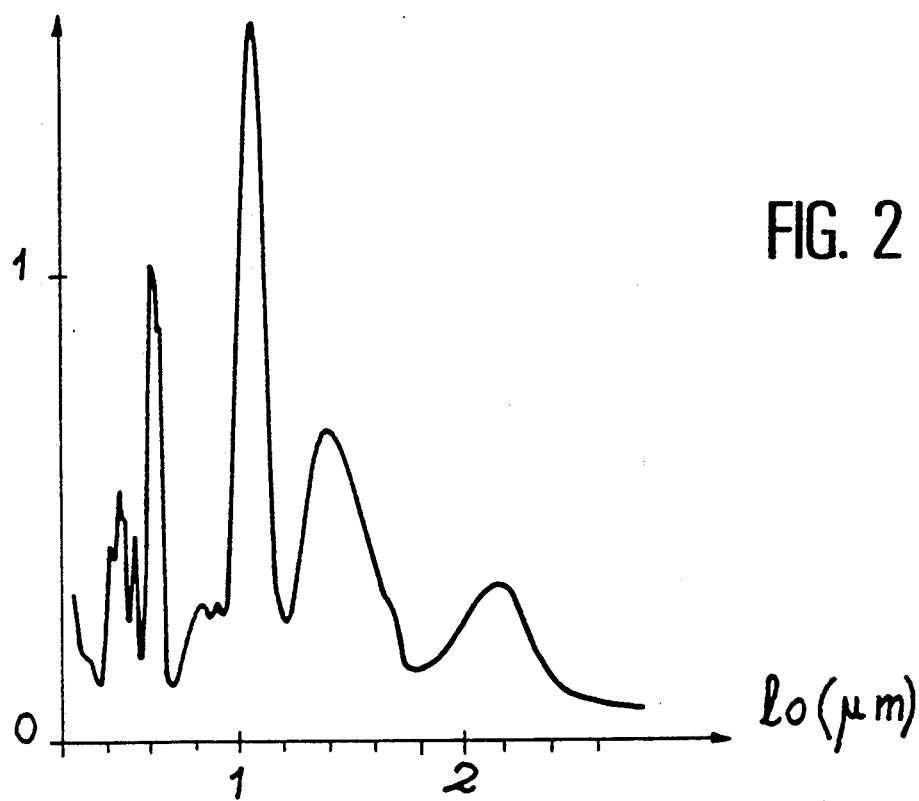

FIG. 2 The optical absorption spectrum (absorbance Ab, expressed in $cm^{-1}$, as a function of the wavelength lo of the incident radiation in micrometers) of a fluoride glass of the ZBLAN type and exclusively containing $U^{4+}$ ions.

Figure 3:
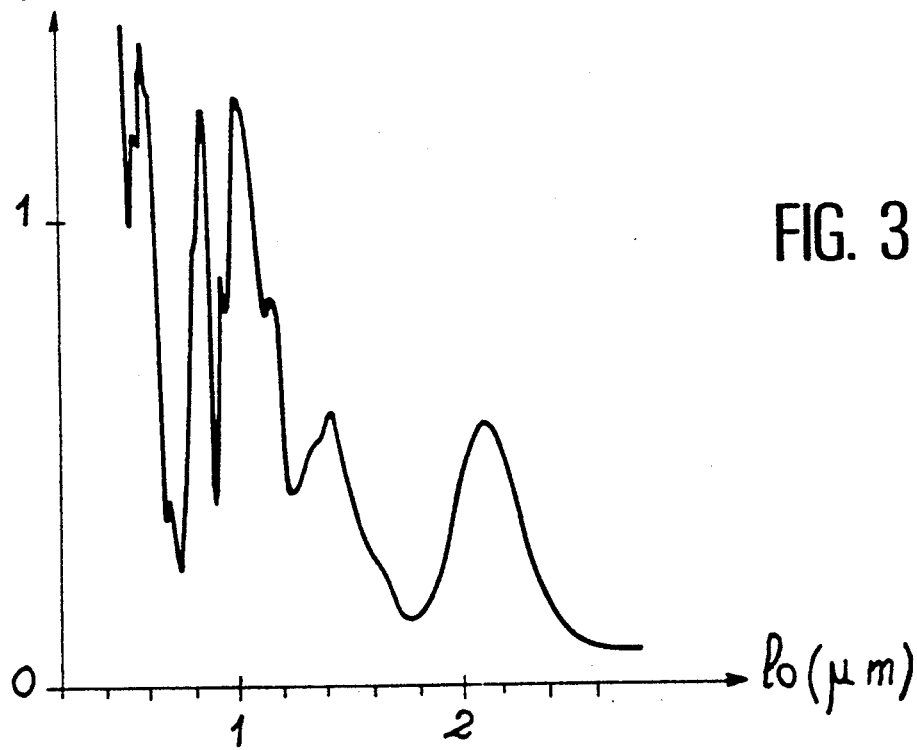

FIG. 3 The optical absorption spectrum of a fluoride glass of the ZBLAN type containing $U^{3+}$ ions.

Figure 4:
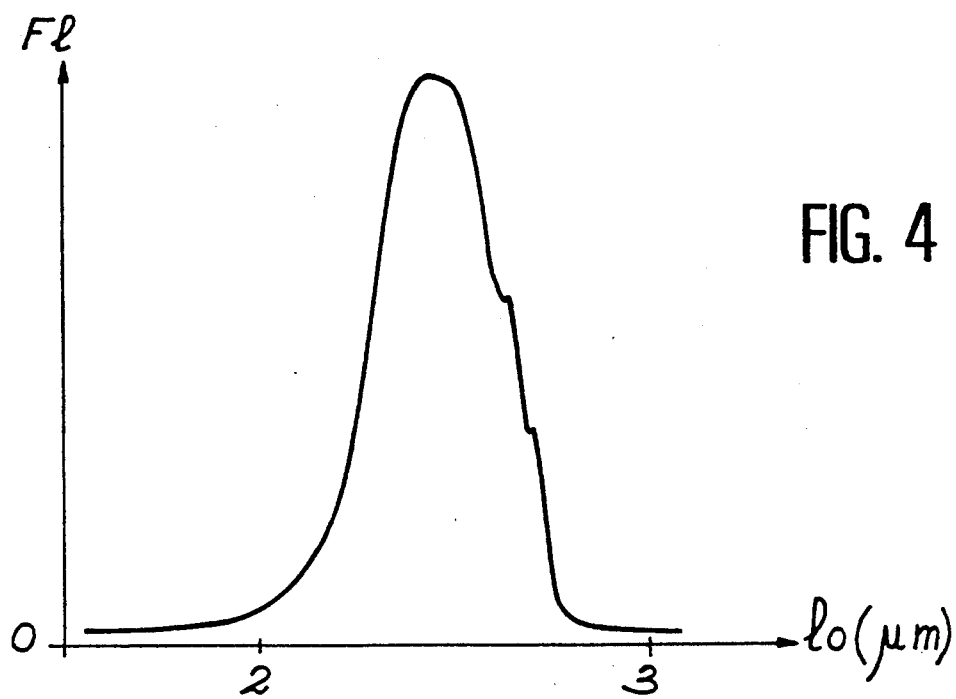

FIG. 4 The fluorescence spectrum (F1, in relative units) of $U^{3+}$ ions, said spectrum being obtained with an optical fibre with a core made from a fluoride glass of the ZBLA type containing $U^{3+}$ ions.

Figure 5:
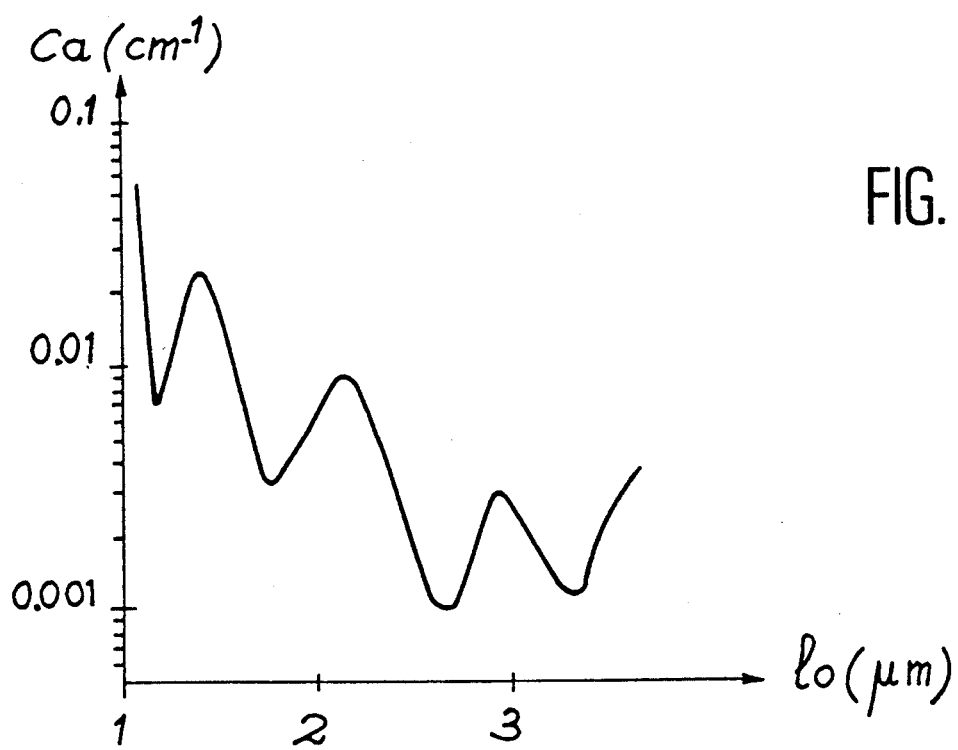

FIG. 5 The variations of the absorption coefficient Ca in $cm^{-1}$, as a function of the wavelength, for a fluoride glass optical fibre having a core made from a fluoride glass of type ZBLA and containing $U^{3+}$ ions.

In the first stage of a process according to the invention, preparation takes place of a halide glass containing uranium of valency 4 and/or 5 and having the requisite optical properties.

More specifically, the first stage is to prepare a halide glass, e.g. a fluoride glass, which has the requisite optical properties and which can contain valency 4 uranium, such as is possessed by uranium in the compound $UF_4$, valency 5 uranium, such as is possessed by uranium in the compound $UF_5$, or both valency 4 and valency 5 uranium, uranium having such valencies e.g. in intermediate valency compounds, such as $U_4F_{17}$ or $U_5F_{22}$.

For this purpose, use is made of a mixture of the constituents of the glass in the powder state, to which uranium is added in the desired proportions.

Another operating procedure consists of using the halide glass and incorporating uranium into it. The mixture obtained is melted.

To obtain the requisite optical properties of the halide glass containing $U^{4+}$ and/or $U^{5+}$ ions considerable care must be taken on the one hand with respect to the halogen-containing constituents of the glass from which elimination takes place of the species producing extrinsic optical losses, such as oxides, oxyfluorides, impurities such as e.g. foreign bodies, metals in the list including iron, cobalt, nickel, copper and manganese and on the other hand (a) with respect to the performance of the fluorination treatment which may be needed (see hereinafter) and (b) in the choice of the materials and atmospheres in contact with the glass during the preparation operation.

In particular, to obtain the requisite optical properties of the halide glass containing tetravalent and/or pentavalent uranium, the melted glass is preferably exposed to an oxidizing atmosphere. The latter is e.g. formed by 90% nitrogen and 10% oxygen without water vapour. It can also be a gaseous fluorinating agent.

After melted the mixture until a homogeneous phase is obtained, the melted glass is poured into an appropriate envelope. The $U^{4+}$ ions give the glass a green colour.

It is pointed out that the uranium used for the production of the halide glass containing $U^{4+}$ and/or $U^{5+}$ ions can be chosen in one of the following forms: $UF_3$, $UF_4$, $UF_5$, $UF_6$, $UCl_4$, $UH_3$, a salt of $UO_2^{++}$, an organometallic salt of uranium and uranium metal in powder form. Preference is given to uranium in the form of a valency 4 salt, such as $UCl_4$ or $UF_4$. For fluoride glasses preference is given to $UF_4$.

Moreover, for the production of the glass, use is made in one of the preceding forms in exemplified manner, of a natural uranium or a $U_{235}$ isotope-depleted uranium, the fissile element isotopic content then being equal to or below 0.7%.

The uranium is of valency 4 and/or 5 in the halide glass and preferably it is ensured that there is no valency 6 uranium.

This can be obtained following a fluorination treatment prior to the production of the glass, e.g. using ammonium difluoride, or using a gaseous fluorinating agent chosen from within the group including $SF_6$, $NF_3$, $ClF$, $ClF_3$, $HF$ or $F_2$.

To obtain a halide glass containing uranium in the exclusive form of $U^{4+}$ ions, all the constituents of the medium are taken in the form of halides and the physicochemical conditions for the melting and refining operations of the glass are chosen so as to avoid any excessive oxidation.

The case of a halide glass containing uranium exclusively in the form $U^{4+}$ is shown in FIG. 2 for a ZBLAN-type fluoride glass (Zr, Ba, La, Al, Na), where the absorption bands at 2.1, 1.4, 1.08, 0.64, 0.53 and 0.48 micrometer are characteristic of $U^{4+}$ ions.

This $U^{4+}$ ion-containing glass, which is melted under an oxidizing atmosphere, has no diffusion centres prejudicial to the use for which it is intended.

More specifically, in the near infrared region from 2.2 to 3.4 micrometers, the minimum of optical losses of said fluoride glass containing $U^{4+}$ ions is below 0.01 $cm^{-1}$.

A melted halide glass containing $U^{4+}$ and/or $U^{5+}$ ions is poured into envelopes appropriate to the use for which said glass is intended.

FIG. 1 shows the forms which can be assumed by said halide glass. The latter can e.g. be a solid glass bar 2, or the core glass of a preform 4 for an optical fibre, or the core glass of an optical fibre 6, or the glass of the guiding part of a planar optical guide.

The preform 4 is e.g. obtained by pouring the halide glass 8 into a hollow cylinder 10 formed from the external glass of the preform 4 and having a refractive index below that of the central glass 8. The optical fibre 6, whose core is formed from the halide glass, is obtained by stretching or drawing out a preform like preform 4.

FIG. 1 shows the core 12 and the sheath 14 of the fibre 6.

For example, the diameter of the core 12 is between 3 and 30 micrometers and the diameter of the sheath 14 approximately 110 micrometers.

The thus obtained halide glass has, when it contains $U^{4+}$ ions, a fluorescence towards 500 nm when illuminated by a visible or ultraviolet radiation, said fluorescence being characteristic of $U^{4+}$ ions. No fluorescence attributable to the uranyl ion or $U^{3+}$ ion was observed.

FIG. 1 also shows the glass of the guiding part 20 of the planar optical guide 18, as well as the substrate 22 of the latter.

The planar optical guide 18 can be prepared by the deposition of a layer of a halide glass containing $U^{4+}$ and/or $U^{5+}$ ions on an appropriate vitreous substrate or by ion implantation or thermal diffusion, into a part of such a substrate, of appropriate elements including $U^{4+}$ and/or $U^{5+}$ ions for the formation of the glass of the guiding part.

Halide glasses and/or composite glasses prepared in the described manner are then exposed to ionicing radiation emitted by a source 16, as can be seen in FIG. 1.

When exposed to such ionizing radiation, said halide and composite glasses can reach a temperature between 4 and 500K. Preferably, these glasses are maintained at the liquefaction temperature of the nitrogen or at ambient temperature.

There is a reduction of the $U^{4+}$ and/or $U^{5+}$ ions into $U^{3+}$ ions under the action of said radiation, which can e.g. be constituted by X photons, gamma photons or pulsed or continuous electrons having an adequate energy to ensure said reduction over the desired thickness of the glass containing the $U^{4+}$ and/or $U^{5+}$ ions. For example, it is possible to use X photons with energies between 0.1 and 100 keV.

In practical terms, such a X radiation can be supplied by a white light synchrotron, or by the bombardment of a target, such as e.g. chromium (5.4 keV), copper (8 keV), molybdenum (17.5 keV), silver (22 keV) or tungsten (57 keV).

Still in exemplified manner, it is possible to use gamma photons with energies between 10 keV and 3 MeV. For this purpose it is e.g. possible to use an americium 241 source (59.6 keV) or cesium 137 source (661 keV) or cobalt 60 source (1.17 and 1.33 MeV).

Still in exemplified manner, it is possible to use electrons produced either by accelerators, or during the disintegration of a beta emitter radionuclide. It is e.g. possible to use as the beta source promethium 147 (average energy Em=62 keV), or thallium 204 (Em=243 keV), or strontium 90 (Em=939 keV).

During the treatment of the halide glass by ionizing radiation, colour centres are created in the said glass and which are more particularly absorbent in the ultraviolet and visible ranges.

In a variant of the process according to the invention, to improve the transparency of the halide glass containing trivalent uranium ions, said glass can be exposed to a heat treatment having the effect of eliminating the colour centres or reducing the quantity thereof and which is known as a "bleaching treatment". The latter can be a heat treatment.

The bleaching temperature of the glass is e.g. between 50° and 350° C. and the treatment times can range between 0.1 and 10 days. Bleaching can also be obtained by exposing the glass to ultraviolet excitation.

The ZBLAN type fluoride glass containing $U^{4+}$ ions, according to FIG. 2, can be in the form of a bar. By irradiating said bar with gamma radiation from a cobalt 60 source 16, the glass is given a brownish colour.

The absorption spectrum shown in FIG. 3 then reveals the appearance of new bands at 2.15, 1.45, 1.2, 0.96, 0.7, 0.61 and 0.57 micrometer, which are characteristic of $U^{3+}$ ions.

The transformation of $U^{4+}$ ions into $U^{3+}$ ions may not be total.

Another signature of the presence of $U^{3+}$ ions in the glass is its emission spectrum under the effect of white light excitation.

This is demonstrated in FIG. 4 for a ZBLA type fluoride glass optical fibre, whose core has previously been doped with $U^{4+}$ ions and which then underwent ionizing radiation in order to at least partly convert said $U^{4+}$ ions into $U^{3+}$ ions, when the fibre is exposed to light excitation at 0.813 micrometer.

The fluorescence of the $U^{3+}$ ions in this glass covers the spectral range 2.0 to 2.8 micrometers.

The transparency of an optical fibre, whose core is formed from a fluoride glass containing $U^{4+}$ and/or $U^{5+}$ ions and which is exposed to ionizing radiation, which at least partly reduces the $U^{4+}$ and/or $U^{5+}$ ions into $U^{3+}$ ions is revealed in FIG. 5 between the wavelengths 2 and 4 micrometers.

The minimum attenuation in the infrared between the wavelengths 2.2 and 3.4 micrometers is below 0.01 $cm^{-1}$.

Thus, according to the invention process, a medium is obtained which contains $U^{3+}$ ions by preparing a metal halide glass or high transparency in the near infrared from the chosen metals, said glass also containing uranium in the form of $U^{4+}$ and/or $U^{5+}$ ions and subjecting said halide glass to ionizing radiation.

The transparency of the glass in the near infrared region between 2.2, and 3.4 micrometers is maintained following the photoreduction of the $U^{4+}$ and/or $U^{5+}$ ions into $U^{3+}$ ions.

The following non-limitative and purely illustrative examples illustrate the production of media according to the invention, which contain $U^{3+}$ ions and have a high transparency between 2.4 and 2.7 micrometers. These media can be integrated, as active elements, into a laser source or into an optical amplifier operating in the region 2.2 to 2.7 micrometers.

EXAMPLE 1

Example 1 relates to the preparation of samples of a fluorozirconale glass containing different quantities of $U^{3+}$ ions.

The fluoride glass is of the ZBLAN type (zirconium, barium, lanthanum, aluminium, sodium and having respective molar fractions of 53, 20, 4, 3 and 20). Uranium is introduced in the form $UF_4$ during preparation.

Several samples are prepared and contain respective molar fractions of 50, 165, 410 and 1080 ppm uranium.

After melting and refining under an oxidizing atmosphere, the samples are formed into bars, which are green.

FIG. 2 shows the optical spectrum of the ZBLAn glass bar containing 1080 ppm of $U^{4+}$ ions, said bar having a thickness of 15 mm between the optically polished faces. The absorption bands indicate that the uranium is exclusively in the form of $U^{4+}$ ions in said bar.

The samples are irradiated by a cobalt 60 source, which supplies gamma photons of energy levels 1.17 and 1.33 MeV. The samples are then brown.

FIG. 3 shows the optical spectrum of the sample containing a molar fraction of 1080 ppm of $U^{4+}$ ions having absorbed a dose of 130 kGy.

The new absorption bands which appear are attributed to the $U^{3+}$ ions. In parallel, the intensity of the absorption bands of the $U^{4+}$ ions decrease. There is a partial reduction of $U^{4+}$ ions into $U^{3+}$ ions as a result of the gamma radiation.

For samples having initial molar fractions of 50, 165, 410 and 1080 ppm of $U^{4+}$ ions, the molar fractions of $U^{3+}$ ions are respectively 47, 145, 330 and 650 ppm. The relative fractions of $U^{4+}$ ions reduced to $U^{3+}$ ions are respectively 94, 88, 80 and 60%.

The samples are also characterized by their fluorescence spectra.

The samples containing $U^{4+}$ ions exposed to an irradiation by gamma photons are then illuminated by a monochromatic light source, whose wavelength is 0.8 micrometer. The emission spectrum covers the spectral range between 2.0 and 2.7 micrometers with a maximum at 2.2 micrometers.

The fluorescence intensities at 2.2 micrometers of the samples containing initial molar fractions of 50, 165, 410 and 1080 ppm of $U^{4+}$ ions are respectively 16, 100, 94 and 40.

This example 1 shows that in a fluoride glass, the $U^{4+}$ ions are at least partly reduced to $U^{3+}$ ions under the action of a gamma radiation and that the intensity of the fluorescence has a maximum when the molar fraction of the $U^{3+}$ ions in the ZBLAN glass is between 150 and 400 ppm.

The fluoride glass which initially contained a molar fraction of 1080 ppm of uranium in the form of $U^{4+}$ ions and which was exposed to the cobalt 60 source is introduced into an electron spin resonance spectrometer. A wide signal around g-2 only appears when the temperature is below 20K, which characterizes the $U^{3+}$ ion in the glass.

Example 1 shows that it is possible to prepare according to the process of the invention, a fluoride glass using a conventional melting method in an oxidizing atmosphere and that the said glass, which initially contained $U^{4+}$ ions, there is a reduction of $U^{4+}$ into $U^{3+}$ ions by exposing it to ionizing rays.

EXAMPLE 2

Example 2 relates to the production of a fluorozirconate glass containing $U^{3+}$ ions obtained by two ionizing ray types.

The fluoride glass is of type ZBLAT (zirconium, barium, lanthanum, alumnium and thorium with respective molar fractions of 57, 32, 3,4 and 4).

The uranium is introduced in the form of a uranyl salt in a molar fraction of 3000 ppm.

After fluorination treatment by $NH_4FHF$ and then melting under a slightly oxidizing atmosphere, as in all the preparations of the given examples (90% $N_2$ and 10% $O_2$), the glass is cast in the form of a bar, which has a green colouring and the optical absorption spectrum indicates that the uranium is exclusively in the form of $U^{4+}$ ions.

When the glass is illuminated by ultraviolet radiation with a wavelength of 280 nm, there is a fluorescence between 490 and 590 nm with an intense peak at 560 nm, which characterizes the $U^{4+}$ ion. No florescence is absorbed in the range 2 to 3 micrometers, which indicates the absence of $U^{3+}$ ions.

In a first experiment, a glass sample doped with $U^{4+}$ ions is maintained in a cryostat at a temperature of 77K and is illuminated by gamma photons supplied by a cobelt 60 source.

For an absorbed dose of 100 kCy, the glass contains a molar fraction of 780 ppm of $U^{3+}$ ions, which indicate a 26% reduction of the original $U^{4+}$ ions.

In a second experiment, a 0.6 mm glass sample doped with $U^{4+}$ ions is irradiated by electrons. Use is made for this purpose of a pulsed radiation source constituted by an electron gum having a Marx generator and an emissive tube. After focussing the electrons by magnetic fields, the electron beam has an energy of approximately 1.7 MeV and the duration of mid-height pulse action is 8 ns.

When the sample has received an average dose of 100 kGy, there is a molar fraction of 360 ppm $U^{3+}$ ions, which indicates a 12% reduction of the original $U^{4+}$ ions.

Spectral analysis of the fluorescence of the ZBLAT glass containing the $U^{3+}$ ions shows that in addition to a green fluorescence due to the residual $U^{4+}$ ions, there is an infrared fluorescence.

With white light excitation, the fluorescence is observed between 2.2 and 2.6 micrometers with a primary maximum at 2.46 micrometers and a secondary maximum at 2.38 micrometers.

Example 2 indicates that the formation of $U^{3+}$ ions in a fluoride glass can be obtained with different radiation types.

Examples 1 and 2 show that the emission spectrum of the $U^{3+}$ ions is sensitive to the composition of the medium receiving said $U^{3+}$ ions.

EXAMPLE 3

Example 3 relates to the preparation of a fluorozirconohafnate glass sample containing $U^{3+}$ ions and obtained by the absorption of increasing doses of ionizing radiation.

The fluoride glass is of type ZHBLA (zirconium, hafnium, barium, lanthanum and aluminium with respective molar fractions of 30, 30, 32, 3 and 5) and it is doped with uranium in accordance with example 2.

The initial molar fraction of $U^{4+}$ ions is 3000 ppm.

The glass sample is exposed to successive doses of a gamma radiation supplied by a cobalt 60 source.

Following each irradiation, the $U^{3+}$ ion quantity formed in the glass is evaluated and then the sample receives a supplementary dose.

The molar fractions of $U^{3+}$ ions of the glass, for integrated gamma radiation doses are for 70 kGy: 420 ppm, for 270 kGy: 670 ppm and for 2800 kGy: 900 ppm.

This series of experiments shows that the $U^{3+}$ ion quantity in the glass increases with the dose received by the sample.

The ZHBLA glass sample which contained an initial molar fraction of 3000 ppm of $U^{4+}$ ions and exposed to gamma rays and having a molar fraction of 900 ppm of $U^{3+}$ ions is maintained at ambient temperature in the dark.

The $U^{3+}$ ion quantity in the glass follows the following evolution as a function of time:

after 10 days: 800 ppm
after 20 days: 750 ppm
after 1 month: 710 ppm
after 2 months: 680 ppm
after 6 month: 670 ppm
after 1 year: 670 ppm.

Part of the $U^{3+}$ ions formed under irradiation in the glass return to the initial state of $U^{4+}$ ions.

The glass becomes stable at ambient temperature in approximately 1 month.

EXAMPLE 4

Example 4 illustrates the bleaching or whitening of fluoride glasses containing $U^{3+}$ ions for eliminating the colour centres, which are more particularly absorbent in the ultraviolet and visible regions.

The transformation of $U^{3+}$ into $U^{4+}$ ions observed at ambient temperature in example 3 is activated by the temperature.

In order to obtain the equilibrium state, fluoride glass samples containing $U^{3+}$ ions are heated at 280° C. for 100 hours.

In a first experiment use is made of ZBLAN glass samples containing respective initial molar fractions of 165, 410 and 1080 ppm of $U^{4+}$ ions. These samples are exposed to the gamma radiation of cobalt 60 source, which leads to respective molar fractions of $U^{3+}$ ions of 145, 330 and 650 ppm.

After heat treatment at 280° C. for 100 hours, the optical spectra show that the colour centres of the glass formed during gamma irradiation have disappeared. The respective molar fractions of $U^{3+}$ ions are then 48, 123 and 226 ppm.

A second experiment relates to a fluorohafnate glass containing $U^{3+}$ ions. The glass is of type HBLA (hafnium, barium, lanthanum and aluminum with respective molar fractions of 57, 34, 4 and 5). The initial molar fraction of $U^{4+}$ ions is 1500 ppm.

After absorbing a dose of 100 kGy of gamma radiation supplied by a cobalt 60 source, the glass has a molar fraction of 900 ppm of $U^{3+}$ ions.

After a heat treatment at 280° C. for 100 hours, the colour centres of the glass have disappeared and the molar fraction of $U^{3+}$ ions is 300 ppm.

Example 4 demonstrates the possibility of eliminating the colour centres formed during irradiation by ionizing rays by heating, following irradiation, the $U^{3+}$ ion-containing glass sample.

EXAMPLE 5

Example 5 illustrates the preparation of different fluorozirconate glasses containing $U^{3+}$ ions.

The first glass is of type ZBYA (zirconium, barium, yttrium and aluminium with respective molar fractions of 45, 36, 11 and 8). The first glass contains a molar fraction of 660 ppm of uranium in the form of $U^{4+}$ ions.

The second glass is of type ZBYbAN (zirconium, barium, ytterbium, aluminum and sodium with respective molar fractions of 53, 20, 4, 3 and 20).

The second glass contains a molar fraction of 400 ppm of uranium in the form of $U^{4+}$ ions.

The third glass is of type ZBAGT (zirconium, barium, aluminium, gadolinium and thorium with respective molar fractions of 57, 32, 3, 4 and 4). The third glass has a molar fraction of 1000 ppm of uranium in the form of $U^{4+}$ ions.

The fourth glass is of the type ZBLAZn (zirconium, barium, lanthanum, aluminium and zinc with respective molar fractions of 56, 35, 4, 4 and 1). The fourth glass contains a molar traction of 2000 ppm of uranium in the form of $U^{4+}$ ions.

These glasses are irradiated by a cobalt 60 source as in example 1 and the absorbed dose is 130 kGy.

The molar fractions of $U^{3+}$ ions are equal, for the first glass, to 370 pm, for the second to 80 ppm, for the third to 640 ppm and for the fourth to 100 ppm.

Example 5 shows that fluorozirconate glasses permit the choice of the composition of the matrix and the environment of the $U^{3+}$ ion.

EXAMPLE 6

Example 6 relates to the preparation of a zirconium fluorochloride glass containing $U^{3+}$ ions obtained by several irradiation types. The fluorochloride glass is of type ZBLTN (zirconium, barium, lanthanum, thorium and sodium with respective molar fractions of 50, 30, 3, 5 and 12). The fluorine/chlorine molar fractions are in a ratio of 88:12.

The uranium in form $UF_4$ is introduced with a molar fraction of 2800 ppm. The uranium is exclusively in the form of $U^{4+}$ ions.

In a first experiment, a glass sample doped with $U^{4+}$ ions and having a thickness of 0.5 mm, is illuminated by gamma photons having an energy of 59.6 keV and supplied by an americium 241 source.

For an absorbed dose of 130 kGy, the glass contains a molar fraction of 1120 ppm of $U^{3+}$ ions, which corresponds to a 40% reduction of the original $U^{4+}$ ions.

In a second experiment and with a glass sample doped with $U^{4+}$ ions and which has a thickness of 1 mm, illumination takes place by X photons having an energy of 17.5 keV and which are emitted by an X ray generator equipped with a rotary molybdenum anode.

Irradiation takes place with a current of 0.3 A and a voltage of 60 kV for 24 hours.

Under these conditions, after irradiation, the glass contains a molar fraction of 260 ppm of $U^{3+}$ ions, which corresponds to a 45% transformation of the $U^{4+}$ ions of the matrix.

In a third experiment a glass sample doped with $U^{4+}$ ions and having a thickness of 1 mm is exposed to beta radiation supplied by a strontium 90 source with a maximum energy of 2.28 MeV. There is a reduction of $U^{4+}$ into $U^{3+}$ ions when the sample has received a dose of 10 Gy.

Example 6 shows that the $U^{4+}$ ions of a fluorochloride glass exposed to gamma, X and beta radiations are reduced to $U^{3+}$ ions.

EXAMPLE 7

Example 7 relates to the preparation of several fluoroaluminate glasses containing $U^{3+}$ ions.

In a first experiment, preparation takes place of BATY-type fluoride glasses (barium, aluminium, thorium and yttrium with respective molar fractions of 20, 30, 20 and 30). The uranium is introduced in the form of $UF_4$ in different concentrations. It is present in the glass exclusively in the form of $U^{4+}$ ions.

Samples having respective molar fractions of 2400, 4600 and 9100 ppm of $U^{4+}$ ions are exposed to a gamma photon source with energies of 1,17 and 1.33 MeV.

For an absorbed dose of 130 kGy, the molar fractions of $U^{3+}$ ions are respectively 660, 1200 and 1490 ppm, which corresponds to reductions of the initial $U^{4+}$ into $U^{3+}$ ions of respectively 37, 36 and 16.

In a second experiment preparation takes place of a BATY-type fluoride glass as in the first experiment. Uranium in form $UF_4$ is used.

In this case, the operating conditions are chosen in such a way that the uranium is in the form of $U^{4+}$, $U^{5+}$ and $U^{6+}$ ions with respective molar fractions of 250, 130 and 620 ppm.

For an absorbed dose of 130 kGy of a gamma radiation supplied by a cobalt 60 source, there is essentially a formation of $U^{3+}$ ions to the detriment of $U^{5+}$ ions. This represents a molar fraction of 70 ppm, which corresponds to an 18% transformation of $U^{4+}$ and $U^{5+}$ ions contained in the glass.

In a third experiment preparation takes place of a multicomponent fluoride glass based on aluminium-zirconium AZYMN (aluminium, zirconium, yttrium, barium, calcium, strontium and sodium having respective molar fractions of 30, 10, 9, 14, 20, 13 and 4).

The uranium in the glass is exclusively in the form of $U^{4+}$ ions and its molar fraction is 2500 ppm.

After irrodiation by gamma photons emitted by a cobalt 60 source, the glass contains a molar fraction of 800 ppm of $U^{3+}$ ions for an absorbed dose of 130 kGy, which corresponds to a 32% conversion of the uranium introduced.

Example 7 shows that fluoride glasses with an aluminium or aluminium-zirconium dominance make it possible to stabilize the $U^{3+}$ ions and also that the $U^{3+}$ ions result from a reduction of $U^{4+}$ and/or $U^{5+}$ ions.

EXAMPLE 8

Example 8 relates to the preparation of a multimode optical fibre of fluoride glasses, whose core glass contains $U^{3+}$ ions.

The first stage is the preparation of a preform whose optical fibre is a reduction. This preform has a ZBLAN type sheath glass and a ZBLA type core glass containing $U^{4+}$ ions. The uranium is exclusively in the form of $U^{4+}$ ions and its molar fraction is 150 ppm.

Two experiments are carried out on the basis of the two preforms prepared in this way.

In a first experiment an optical fibre is drawn from one of these preforms, whose core contains $U^{4+}$ ions. This fibre then undergoes ionizing radiation.

In a second experiment the other preform is firstly exposed to ionizing radiation and then the preform is drawn or stretched to obtain an optical fibre. The latter has a core diameter of 20 micrometers and a sheath diameter of 110 micrometers. It is covered with a Teflon protective sheath. This optical fibre is on index jump multimode fibre.

The spectral attenuation curve of the optical fibre, whose core glass contains $U^{4+}$ ions, has higher transparency regions in the infrared and in particular at around 2.6 to 2.7 micrometers and also at 3.3 micrometers. The minimum of the losses is approximately 0.001 $cm^{-1}$ in the range 2.2 to 3.4 micrometers.

The ionizing radiation used is supplied by a cobalt 60 source and the absorbed dose is 500 kGy.

In the first experiment, the optical fibre core glass exposed to ionizing radiation contains a molar fraction of 135 ppm of $U^{3+}$ ions. The curve of the optical losses in the infrared is shown in FIG. 5.

The transparency of the $U^{4+}$ ion-containing fluoride glass in the region 2.2 to 3.4 micrometers was maintained during the transformation of the $U^{4+}$ into $U^{3+}$ ions by ionizing radiation.

In the second experiment the core glass of the optical fibre obtained following the stretching of the preform exposed to ionizing radiation, contains a molar fraction of $U^{3+}$ ions of 60 ppm. The minimum of the optical losses in the range 2.2 to 3.4 micrometers is approximately 0.001 $cm^{-1}$.

Example 8 shows that with a process according to the invention it is possible to introduce $U^{3+}$ ions into the core glass of a fluoride glass optical fibre, whilst maintaining a good transparency of said core, i.e. optical losses not exceeding 0.01 $cm^{-1}$ with the absorption minimum between 2.2 and 3.4 micrometers.

EXAMPLE 9

Example 9 relates to the preparation of a monomode fluoride glass optical fibre, whose core glass contains $U^{3+}$ ions. The operating procedure of example 8 is adopted for producing the preform, whose stretching leads to the optical fibre.

In example 9 the molar fraction of uranium in form $U^{4+}$ in the core glass is 40 ppm.

From this preform is drawn an optical fibre, whose core diameter is approximately 5 micrometers and whose sheath diameter is 100 micrometers.

The fibre is covered with a synthetic resin obtained by the polymerization of an epoxy resin-acrylate film having a thickness of 100 micrometers under ultraviolet radiation.

It is pointed out that the refractive index difference between the core glass and the sheath glass is approximately 0.006. The optical fibre is monomodal for wavelengths exceeding 0.9 micrometer.

This fibre, whose core contains $U^{4+}$ ions is exposed to ionizing radiation from a cobalt 60 source, as in example 8. After irradiation under a dose of 500 kCy, the molar fraction of the $U^{3+}$ ions of the core glass is 35 ppm.

The minimum of the optical losses of this monomode fibre occurs at the wavelength of 2.7 micrometers and is approximately 0.001 $cm^{-1}$.

The fluorescence of the uranium ions of the core glass is observed by illuminating the fibre with a continuous monochromatic beam with a wavelength of 0.813 micrometer and having a power of 15 mW. A fluorescence is observed in the region between 2.0 and 2.8 micrometers, as shown in FIG. 4, which corresponds to the case of a 1.5 m long fibre.

The wavelength where the fluorescence intensity is at a maximum is 2.45 micrometers for a 1.5 m long fibre and 2.25 micrometers for a 0.4 m long fibre.

The fluorescence is attributed to the trivalent $U^{3+}$ uranium ions of the core glass and corresponds to the transition $^4I_{11/2}$ to $^4I_{9/2}$.

Using an optical fibre prepared in this way and having a length of 1.5 m and which is pumped by a titanium-doped sapphire laser with a power of 100 mW, a continuous emission at 2.55 micrometers is observed at ambient temperature. The output power is approximately 1 mW.

Example 9 illustrates the possibility of adjusting the wavelength of the maximum of the fluorescence intensity in the near infrared by means of the optical fibre length and the aptitude of an optical fibre; whose core contains $U^{3+}$ ions, to form a laser emitting in the wavelength range 2.2 to 2.7 micrometers.

I claim:

1. An optical light guide including a light guidance glass and a sheath or substrate glass means having a refraction index below that of the guidance glass, said guidance glass being formed of a fluoride glass selected from the group consisting of fluoroberyllate glasses, fluorozirconate glasses, fluorohafnate glasses, fluorozirconohafnate glasses, fluoroaluminate glasses, mixed fluorozirconoaluminate glasses, mixed fluorohafnoaluminate glasses, and mixed fluorozirconohafnoaluminate glasses, said fluoride glass containing between 1 ppm and 10,000 ppm of trivalent uranium ions and at least one point of a near infrared region between 2,2 and 3.4 micrometers, optical losses not exceeding 4.3 dB.m$^{-1}$.

2. The article of claim 1, wherein said infrared region is between 2.2 and 2.7 micrometers.

3. The article of claim 1, wherein said fluoride glass also contains at least one chemical element selected from the group consisting of zirconium, hafnium, the alkali metal group, the alkaline earth group, aluminum, gallium, scandium, yttrium, the rate earths and thorium.

4. The article of claim 1, wherein said fluoride glass also contains at least one other halide selected from the group consisting of chlorine, bromine and iodine.

5. The article of claim 1, wherein the molar fraction of trivalent uranium ions is between 2 ppm and 400 ppm.

6. The article of claim 1, wherein the fluoride glass also contains at least one rare earth selected from the group consisting of neodymium, praseodymium, europium, holmium, erbium, samarium, thulium, dysprosium and ytterbium.

7. The article of claim 1, wherein said light guidance glass is a core of an optical fiber or an optical guide layer of a planar optical guide.

8. The article of claim 1, wherein said light guidance glass is a monomode optical guide at least as from a wavelength of 2.2 micrometers.

9. The article of claim 1, wherein said fluoride glass also contains tetravalent uranium ions.

10. The article of claim 1, wherein said optical guidance glass is optically coupled to at least one optical fiber having a core made from fluoride glass.

11. A method of transmitting radiation in said fluoride glass according to claim 1, comprising the steps of pumping said fluoride glass by a laser selected from the group consisting of dye lasers, ionized gas lasers, doped insulant lasers, superluminescent laser diodes and semiconductor laser diodes, and obtaining fluoresced light from said fluoride glass at a wavelength substantially at the wavelength of minimum attenuation of said fluoride glass.

12. Process for the production of the optical light guide of claim 1, comprising the steps of initially forming the light guidance glass of a precursor fluoride glass containing between 1 ppm and 10,000 ppm of uranium ions, at least part of the uranium ions being selected from the group consisting of tetravalent and pentavalent uranium ions, and subjecting said initially formed light guidance glass to ionizing radiation to produce trivalent uranium ions from said uranium ions and to form thereby said light guidance glass.

13. Process according to claim 12, including the further step of subsequently bleaching said light guidance glass.

14. Process according to claim 13, wherein at least part of the uranium ions in said precursor fluoride glass of the initially formed light guidance glass are tetravalent ions.

15. Process according to claim 13, wherein substantially all of the uranium ions in said precursor fluoride glass of the initially formed light guidance glass are tetravalent ions.

16. Process according to claim 14, wherein the molar fraction of said tetravalent uranium ions in said precursor fluoride glass in between 5 ppm and 500 ppm.

17. Process according to claim 12, wherein the ionization radiation is selected from the group consisting of X photons, gamma photons, electrons, helions, protons, deutons, tritons, heavy ions and neutrons having an adequate energy to transform the uranium ions in said precursor fluoride glass of the initially prepared light guidance glass into trivalent uranium ions.

* * * * *

UNITED STATES PATENT AND TRADEMARK OFFICE
CERTIFICATE OF CORRECTION

PATENT NO. : 5,313,547

DATED : May 17, 1994

INVENTOR(S) : Jacques Lambard et al.

It is certified that error appears in the above-identified patent and that said Letters Patent is hereby corrected as shown below:

On the face of the patent, Section [73] Assignee should read:

--France Telecom Etablissement Autonome de Droit Public, France; and Commissariat A L'Energie Atomique, France--

Column 9, line 58, "lo" should be --$\underline{lo}$--.

Column 11, line 51, "ionicing" should be --ionizing--.

Column 12, line 66, "2.2," should be --2.2.--.

Column 15, line 50, after "of" insert --a--.

Column 17, line 23, "16" should be --16%--.

UNITED STATES PATENT AND TRADEMARK OFFICE
CERTIFICATE OF CORRECTION

PATENT NO. : 5,313,547
DATED : May 17, 1994
INVENTOR(S) : Jacques Lambard et al.

It is certified that error appears in the above-identified patent and that said Letters Patent is hereby corrected as shown below:

Column 19, line 36, "2,2" should be --2.2--.

Column 19, line 37, "dB.m$^{-1}$" should be --dB•m$^{-1}$--.

Column 19, line 44, "rate" should be --rare--.

Signed and Sealed this

First Day of November, 1994

*Attest:*

BRUCE LEHMAN

*Attesting Officer*     Commissioner of Patents and Trademarks